(12) United States Patent
Sasanouchi et al.

(10) Patent No.: US 6,507,202 B1
(45) Date of Patent: Jan. 14, 2003

(54) SENSED-PRESSURE-DATA CONVERTER

(75) Inventors: Kiyotaka Sasanouchi, Osaka (JP);
Susumu Nishimoto, Nara (JP);
Norimitsu Kurihara, Saitama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/763,064

(22) PCT Filed: Jun. 28, 2000

(86) PCT No.: PCT/JP00/04234

§ 371 (c)(1),
(2), (4) Date: Apr. 3, 2001

(87) PCT Pub. No.: WO01/01095

PCT Pub. Date: Jan. 4, 2001

(30) Foreign Application Priority Data

Jun. 29, 1999 (JP) ............................................. 11-182854

(51) Int. Cl.[7] ........................... G01R 29/22; G06F 19/00
(52) U.S. Cl. .......................................... 324/727; 702/98
(58) Field of Search ................................ 324/727, 132, 324/724, 765, 115; 702/98; 73/708, 727

(56) References Cited

U.S. PATENT DOCUMENTS

| 4,399,515 A | | 8/1983 | Gross |
| 5,146,788 A | * | 9/1992 | Raynes ........................... 338/4 |
| 5,479,096 A | * | 12/1995 | Szczyrbak et al. .......... 324/132 |

FOREIGN PATENT DOCUMENTS

| JP | 63-290922 | 11/1988 |
| JP | 5-45520 | 6/1993 |
| JP | 6-265425 | 9/1994 |
| JP | 9-061276 | 3/1997 |
| JP | 11-083420 | 3/1999 |

\* cited by examiner

*Primary Examiner*—Christine Oda
*Assistant Examiner*—James Kerveros
(74) *Attorney, Agent, or Firm*—McDermott, Will & Emery

(57) ABSTRACT

A sensed-pressure-data converter having a circuit for reducing a fluctuation of the output due to a fluctuation of a resistance and a resistance changing characteristic of a pressure sensitive resistance element and for reducing the output offset and offset drift of the pressure sensitive resistance element. The converter of the invention comprises a pressure sensitive resistance element (1), and a controller (2). The controller is an electric circuit connected to the pressure sensitive resistance element for detecting the electric characteristic of the element and includes A/D converters (3, 4), a D/A converter (6), and a memory (5). The controller compensates the electric characteristic due to a resistance change of the pressure sensitive resistance element and issues it from the D/A converter (6). The sensed-pressure-data converter further comprises a temperature sensor connected to the input terminal of the A/D converter in the controller, an adjustment input terminal (7) for inputting an error between the electric characteristic of the pressure sensitive resistance element and a reference electric characteristic into the input terminal of the A/D converter in the controller, which reduces the output offset and offset drift of the pressure sensitive resistance element.

5 Claims, 14 Drawing Sheets

FIG. 14  (PRIOR ART)
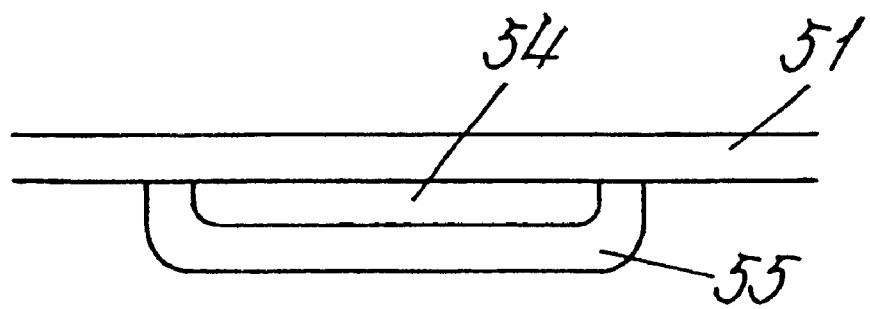
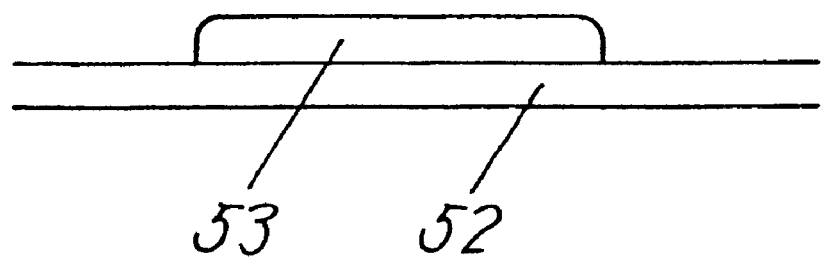

SENSED-PRESSURE-DATA CONVERTER

TECHNICAL FIELD

The present invention relates to a sensed-pressure-data converter having a circuit for reducing an output offset and an offset drift of a pressure sensitive resistance element.

BACKGROUND ART

Today, pressure sensitive resistance elements are widely used as various pressure sensors and keyboard switches. FIG. 14 is an explanatory diagram showing a conventional pressure sensitive resistance element. In FIG. 14, reference numeral 51 denotes an upper film as an insulating substrate, reference numeral 52 denotes a lower film also as an insulating substrate, reference numeral 53 denotes an Ag electrode pattern formed on lower film 52, reference numeral 54 denotes an Ag electrode pattern formed on upper film 51 oppositely to Ag electrode patterns 53, and reference numeral 55 denotes a pressure sensitive conductor applied and formed on the Ag electrode pattern 54. Lower film 52 and upper film 51 are disposed so that pressure sensitive conductor 55 may contact with Ag electrode pattern 53. This pressure sensitive conductor 55 is formed by mixing conductive particles in an insulating rubber material. Pressing and, compressing pressure sensitive conductor 55 makes gaps of the conductive particles in pressure sensitive conductor 55 narrower and the resistance lower. That is, as the pressure getting high, the resistance falls. In the conventional sensed-pressure-data converter, this resistance change is directly converted into a voltage.

In such conventional pressure sensitive resistance element, in general, the pressure sensitive conductor is formed by printing method in order to reduce cost, and therefore, the resistance and resistance changing characteristic vary depending on the thickness of the pressure sensitive conductor. Consequently, it was difficult to maintain the resistance at a desired value and keep fluctuations of the changing characteristic within a specific range. It was hence difficult to obtain a desired output if the resistance value of the pressure sensitive resistance element is directly converted into a voltage.

SUMMARY OF THE INVENTION

The invention is intended to solve these problems, and it is hence an object thereof to present a sensed-pressure-data converter having a circuit for reducing an output offset and an offset drift of a pressure sensitive resistance element.

To solve the problems, the sensed-pressure-data converter of the invention comprises:

a pressure sensitive resistance element having a pressure sensitive conductor interposed between two insulating substrates disposed face to face, for varying the resistance thereof corresponding to the load applied from outside within the confronting surfaces of the insulating substrates; and controller for detecting the electric characteristic of the pressure sensitive resistance element, for converting it to a specific electric characteristic signal and for issuing it.

The controller comprises:

an A/D converter receiving a signal from the pressure sensitive resistance element;

a memory preliminarily storing a compensation value based on an error signal between the electric characteristic of the pressure sensitive resistance element and the reference electric characteristic;

a D/A converter for compensating the electric characteristic due to the resistance change of the pressure sensitive resistance element as compared with the signal from the A/D converter based on the compensation value stored in the memory, for converting it into a specific electric characteristic signal, and for issuing it; and an adjustment value input terminal for entering the error signal into the input terminal of the A/D converter.

In this constitution, a sensed-pressure-data converter capable of reducing the output offset and the offset drift of the pressure sensitive resistance element is obtained.

BRIEF DESCRIPTION OF THE DRAWINGS

FIG. 14 is an explanatory diagram of a conventional pressure sensitive resistance element.

BEST MODE FOR CARRYING OUT THE INVENTION

Embodiment 1

Figure 1:
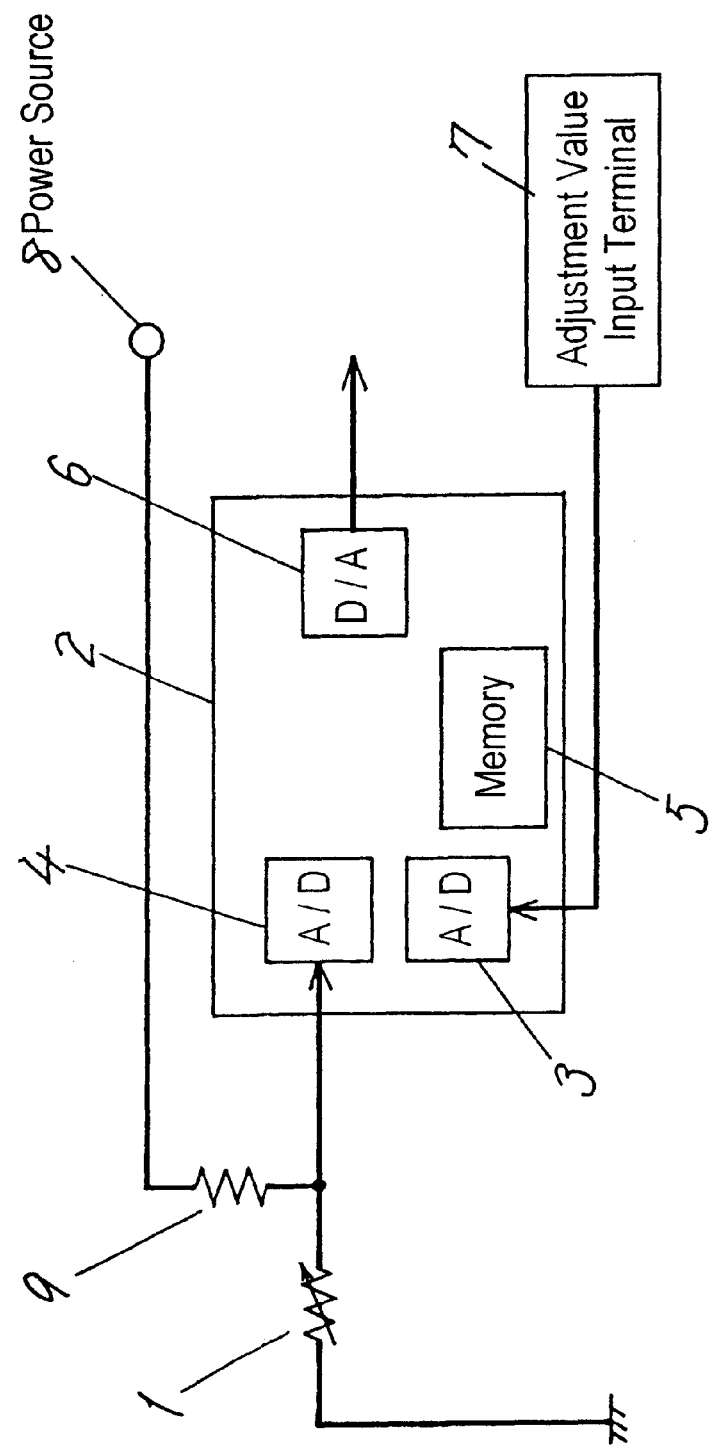
FIG. 1 is a block diagram of a sensed-pressure-data converter according to embodiment 1 of the invention.

FIG. 1 shows a sensed-pressure-data converter in embodiment 1 of the invention. In FIG. 1, reference numeral 1 denotes a pressure sensitive resistance element disposed in two face-to-face insulating substrates as shown in FIG. 14, being grounded at one side. The element is indicated by a symbol of a variable resistance. Reference numeral 2 denotes a controller. Reference numerals 3 and 4 denote A/D converters included in controller 2. A/D converter 4 is connected to the non-grounded side of pressure sensitive resistance element 1. Reference numeral 5 denotes a memory included in controller 2. Reference numeral 6 denotes a D/A converter included in controller 2. Reference numeral 7 denotes an adjustment value input terminal connected to A/D converter 3. Reference numeral 8 denotes a power source. And reference numeral 9 denotes a resistance connected between the non-grounded side-of pressure sensitive resistance element 1 and power source 8.

The sensed-pressure-data converter having such constitution will be explained. Controller 2 is mainly responsible for two operations, a compensation value setting operation and the other is an ordinary operation. That is, controller 2 sets a compensation value if the compensation value is not set and operates ordinarily if it is set.

Figure 2:
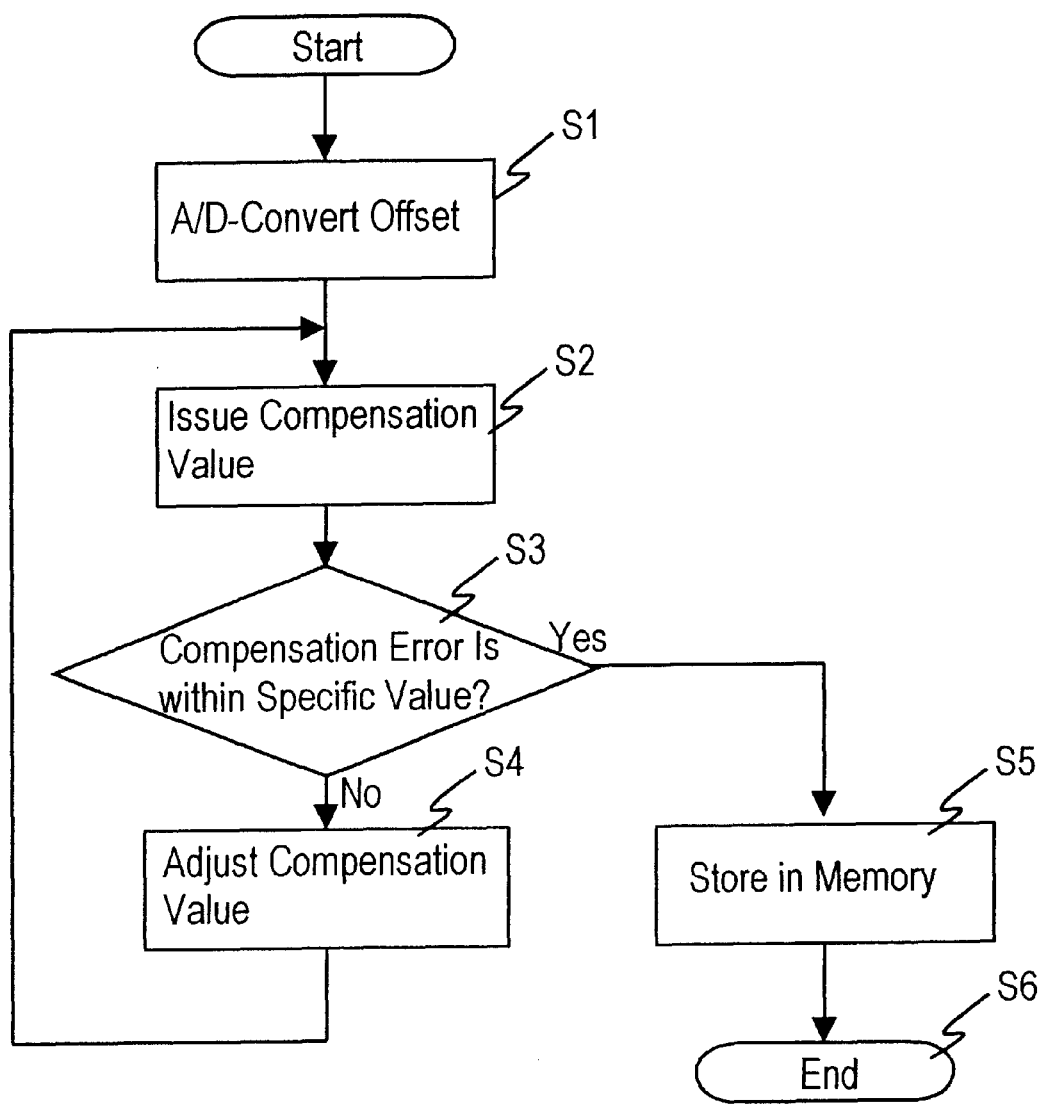
FIG. 2 is a flowchart of a control procedure of a setting operation of a compensation of value the converter.
Figure 3:
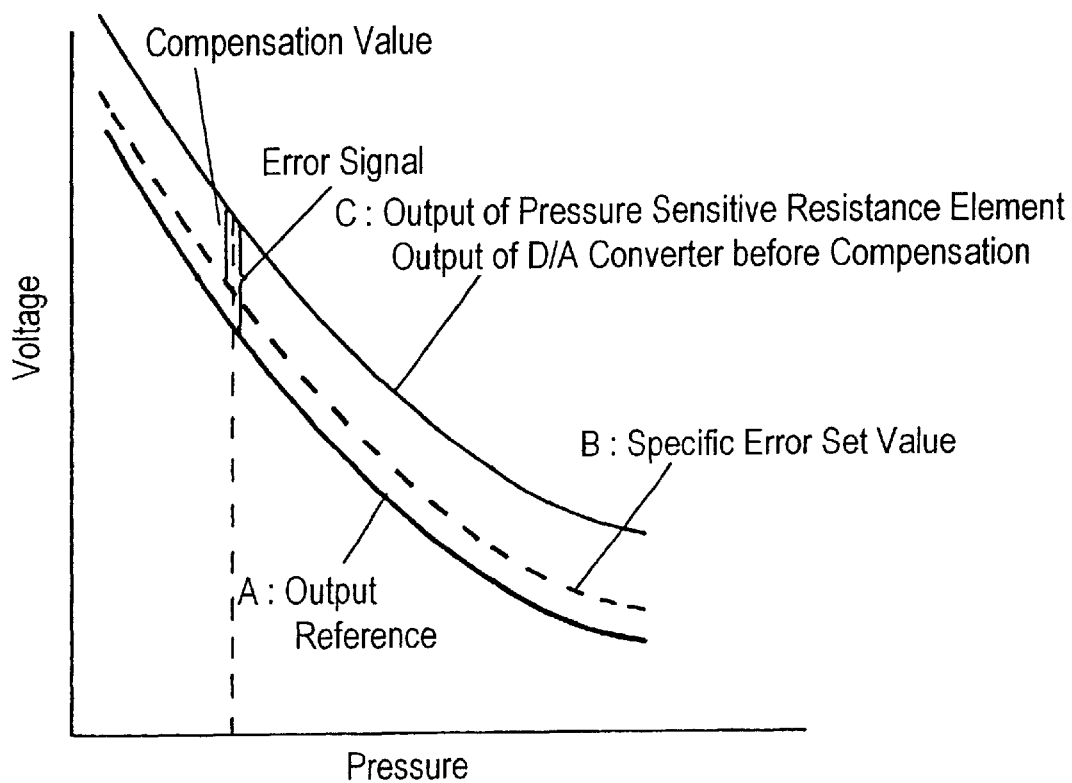
FIG. 3 is an explanatory diagram of a compensation operation of the converter.

First, the compensation value setting operation will be explained. Prior to the description of the compensation value setting operation, the control procedure of controller 2 will be explained by referring to FIG. 1, the flowchart in FIG. 2, and FIG. 3. For setting the compensation value, an error signal between the output from D/A converter 6 of controller 2 and the output reference value of controller 2 is entered into adjustment value input terminal 7. On the other hand, a voltage pulled up to power source 8 by resistance 9 is applied to pressure sensitive resistance element 1. Controller 2 A/D-converts the voltage by feeding it into A/D converter 3 from adjustment value input terminal 7. The voltage pulled up to power source 8 by resistance 9 when a certain pressure is applied to pressure sensitive resistance element 1 is entered into other A/D converter 4, and A/D-converted. The difference of these A/D-converted values is the offset error of the sensed-pressure-data converter. The value compensated at step S2 based on these A/D-converted values is issued from D/A converter 6. At steps S3 and S4, this value is issued from controller 2 and adjusted. Controller 2 again A/D-converts the value of the signal from adjustment value input terminal 7 and judges, at step S3, whether this value is within a specified set value a as compensation error. If this value is within the specific set value, at step S5, this value is stored in memory 5 as a compensation value, and the compensation value setting operation is terminated at step S6. If this value is not within the specific set value, at step S4, the compensation value is adjusted, and this operation is repeated until the value settling within the existing set value. In FIG. 3, curve A shows the pressure-voltage characteristic of an output reference value. Curve B shows the characteristic within the specific set value of the compensation error. Curve C shows the characteristic between the output of pressure sensitive resistance element 1 and the output of D/A converter 6 before compensation. The voltage difference between curve A and curve C shows the error signal, and the voltage difference between curve B and curve C shows the compensation value. When curve C is compensated at steps S3 and S4 and settles between curve A and curve B, the compensation value is stored in the memory at step S5, and the compensation value setting operation is terminated.

Figure 4:
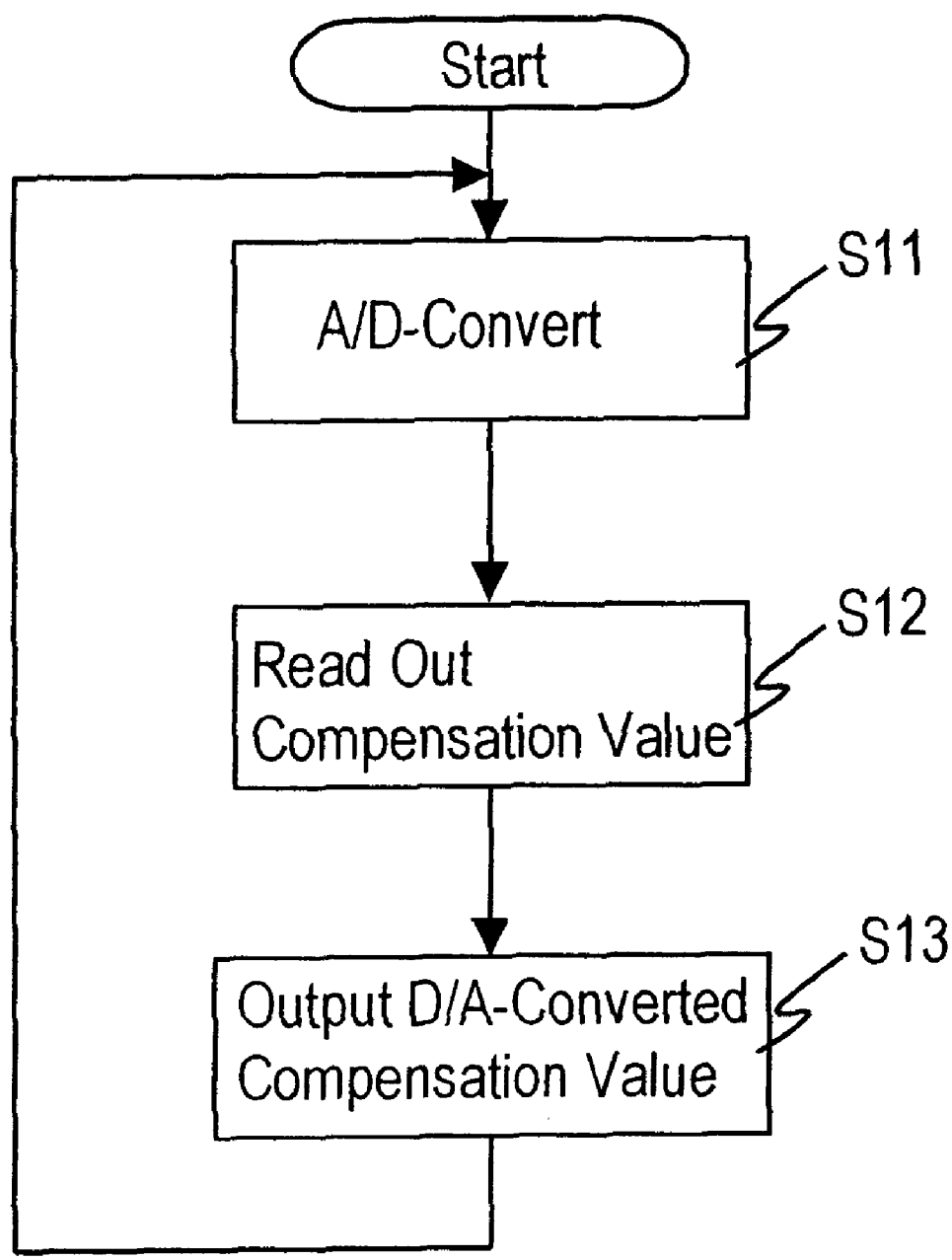
FIG. 4 is a flowchart of a control procedure of an ordinary operation of the converter.

Next, referring to the flowchart in FIG. 4, the ordinary operation will be explained. The output of pressure sensitive resistance element 1 is fed into the A/D converter 4 and A/D-converted at step S11. At next step S12, the compensation value is read out from memory 5 and issued through D/A converter 6 at step S13. In ordinary operation, this procedure is repeated.

Therefore, even if the resistance of pressure sensitive resistance element 1 fluctuates, the output can be converted and issued so as to cancel the offset effectively, and the offset due to the fluctuation of resistance of the pressure sensitive resistance element can thus be reduced.

Memory 5 may be a programmable memory. By providing controller 2 with adjustment value input terminal 7, at the start of the compensation value setting operation, the operation can be started again even if the compensation value has been already set.

The output of pressure sensitive resistance element 1 is fed into other A/D converter 4 than that connected to adjustment value input terminal 7. The same effect is obtained in the same A/D converter by changing over the signal from pressure sensitive resistance element 1 and the signal from adjustment value input terminal 7 by a changeover switch.

Even if two or more pressure sensitive resistance elements 1 are used, the same effect is obtained by that the number of A/D converters 4 is increased, the additional changeover switches are disposed, or the additional D/A converters are disposed.

Or if compensated by applying several values of pressure to pressure sensitive resistance element 1 when set, the compensation values corresponding to the values of pressure may be obtained.

Embodiment 2

Figure 5:
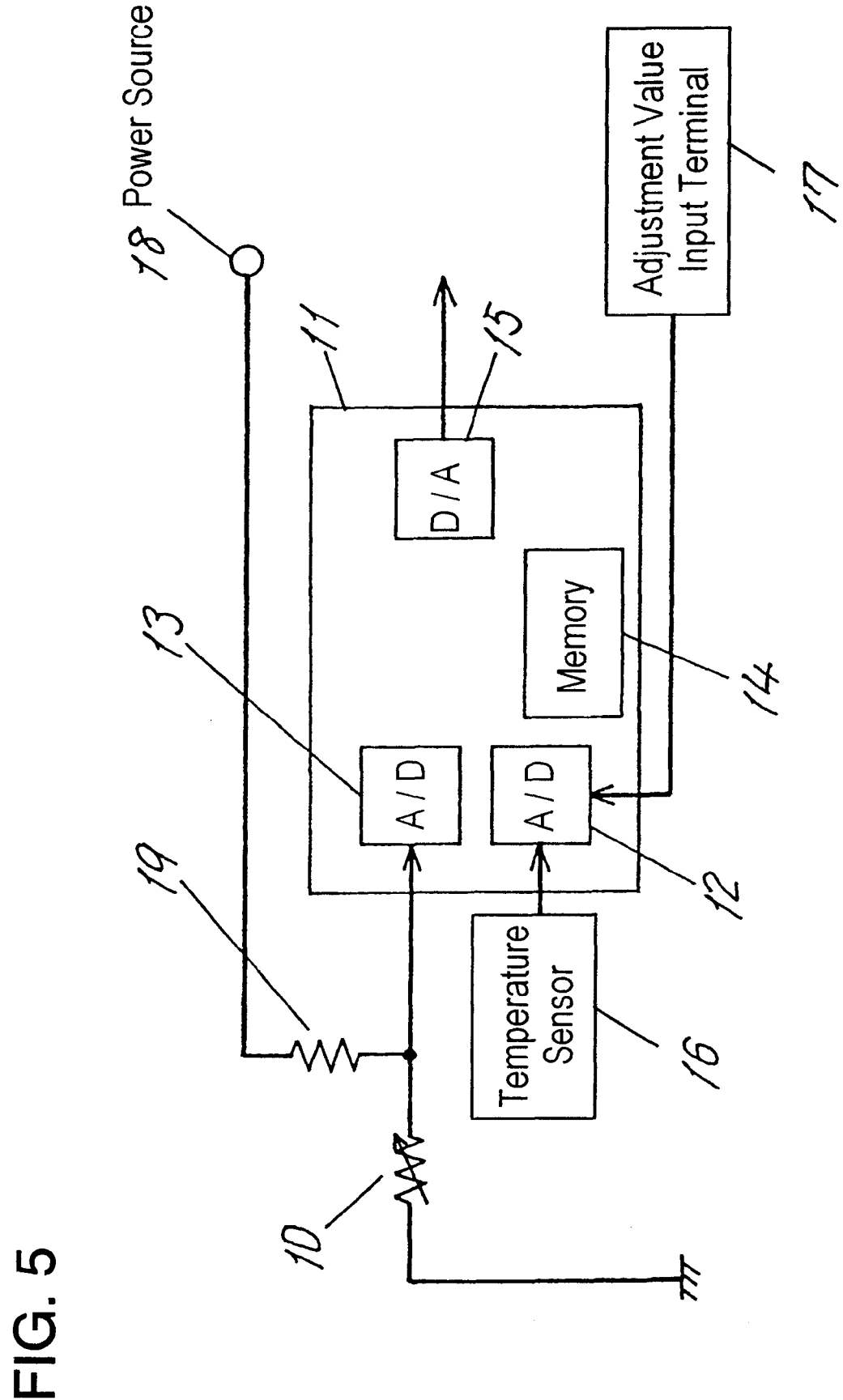
FIG. 5 is a block diagram of a sensed-pressure-data converter according to embodiment 2 of the invention.

FIG. 5 shows a sensed-pressure-data converter in embodiment 2 of the invention. In FIG. 5, reference numeral 10 denotes a pressure sensitive resistance element disposed between two face-to-face insulating substrates as shown in FIG. 14. The element is grounded at one side and is indicated by a symbol of a variable resister. Reference numeral 11 denotes a controller. Reference numerals 12 and 13 denote A/D converters included in controller 11. A/D converter 13 is connected to the non-grounded side of pressure sensitive resistance element 10. Reference numeral 14 denotes a memory included in controller 11. Reference numeral 15 denotes a D/A converter included in controller 11. Reference numeral 16 denotes a temperature sensor connected to A/D converter 12. Reference numeral 17 denotes an adjustment value input terminal connected to A/D converter 12. Reference numeral 18 denotes a power source. And reference numeral 19 denotes a resistance connected between the non-grounded side of pressure sensitive resistance element 10 and power source 18.

The sensed-pressure-data converter having such constitution will be explained. Controller 11 is mainly responsible for two operations. One is a compensation value setting operation and the other is an ordinary operation. That is, controller 11 sets a compensation value if the compensation value is not set, and operates ordinarily when it is set.

Figure 6:
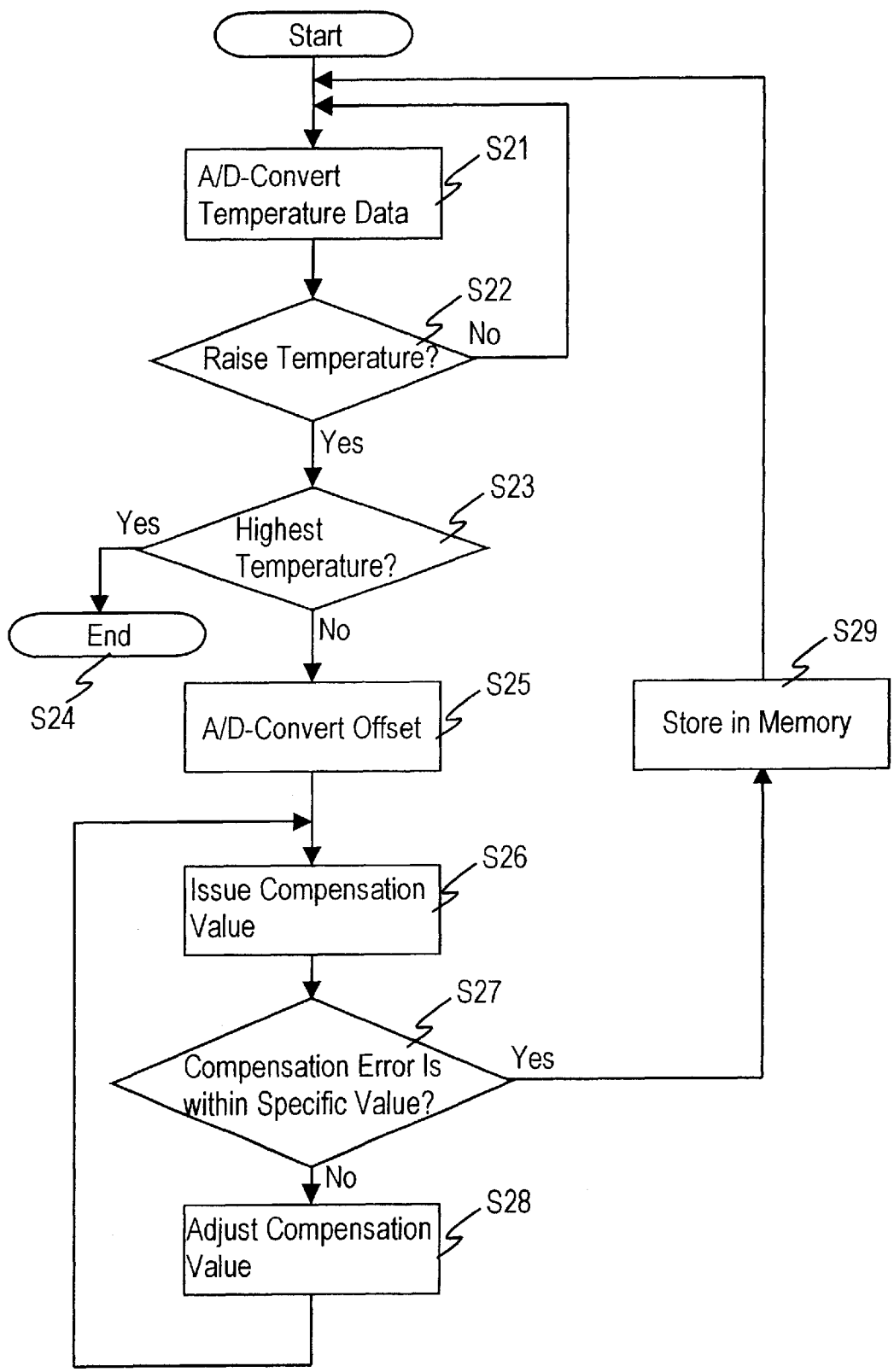
FIG. 6 is a flowchart of a control procedure of a setting operation of a compensation value of the converter.

First, the compensation value setting operation will be explained. For setting the compensation value, the sensed-pressure-data converter is installed in a thermostatic oven or the like capable of controlling the temperature. An error signal between the output of D/A converter 15 in controller 11 and an output reference value of controller 11 is entered into adjustment value input terminal 17. For the compensation value setting operation, the thermostatic oven is controlled so as to trace all operating temperatures of the sensed-pressure-data converter. The control procedure of controller 11 for operating in temperatures raging from lowest operating temperature T1 to highest operating temperature T2 will be explained by referring to the flowchart in FIG. 6. Controller 11 sets the input of A/D converter 12 to temperature sensor 16 and A/D-converts temperature data at step S21. The temperature is set to elevate from lowest operating temperature T1, and the temperature is detected continuously at step S22 from the present temperature to the next compensation temperature. When the temperature is detected, at step S23, it is judged whether this temperature is highest operating temperature T2 or not. If it exceeds the highest operating temperature, at step S24, the compensation value setting operation is terminated. If it does not exceed highest operating temperature T2, at step S25, the input of A/D converter 12 is set to adjustment value input terminal 17, and is A/D converted. In other A/D converter 13, the voltage pulled up to the power source by resistance 19 when a pressure is not applied to pressure sensitive resistance element 10 is input and A/D-converted. The difference between the A/D-converted values shows the offset error of the sensed-pressure-data converter. The value compensated at step S26 on the basis of this A/D-converted value is issued from D/A converter 15. At steps S27 and S28, this value is issued from controller 11 and adjusted. Controller 11 again A/D converts the signal at adjustment value input terminal 17 and judges, at step S27, whether this value is within a specific set value as a compensation error. If this value is within the specific set value, at step S29, this value is stored in memory 14 as the compensation value. And then, the temperature is raised to start to detect the next temperature. If it is not within the specific set value, at step S28, the compensation value is adjusted, and this operation is repeated until it settles within the specific set value.

Figure 7:
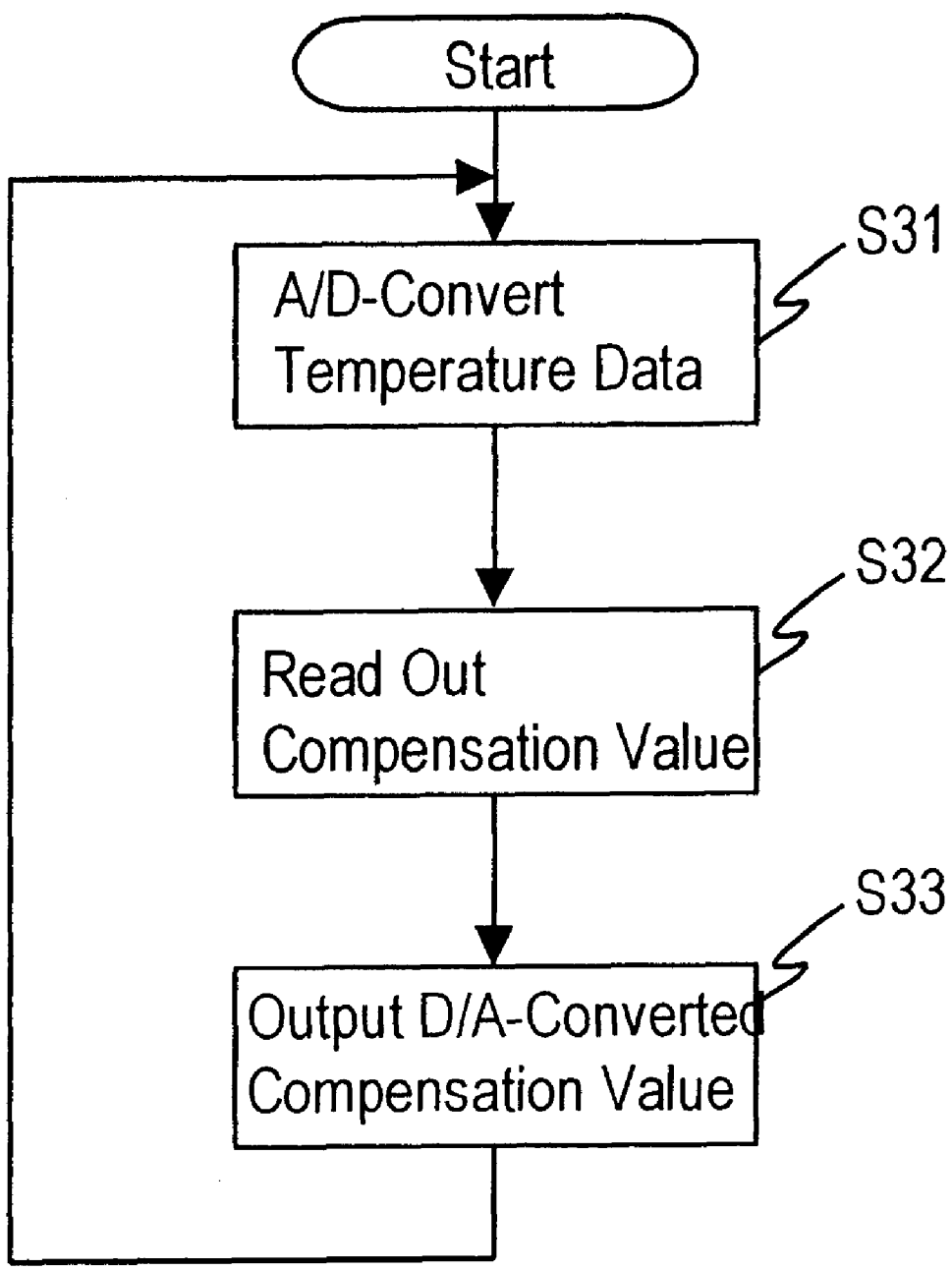
FIG. 7 is a flowchart of a control procedure of an ordinary operation of the converter.

Next, referring to the flowchart in FIG. 7, the ordinary operation will be explained. Controller 11 sets the input of A/D converter 12 to temperature sensor 16, and feeds the output of pressure sensitive resistance element 10 into other A/D converter 13. And at step S31, temperature data and the output of pressure sensitive resistance element 10 are A/D-converted. At next step S32, the compensation value corresponding to the temperature at this time is read out from memory 14, and at step S33, this value is issued from D/A converter 15. In the ordinary operation, this procedure is repeated.

Therefore, since the offset at each temperature can be reduced, even if the pressure sensitive resistance element has a complicated characteristic expressed by a function of temperature, it is possible to convert and issue the compensation value so as to cancel the offset temperature drift effectively.

Meanwhile, For the start-up of the compensation value setting operation, by providing controller 11 with the adjustment value input terminal, the compensation value setting operation can be started again even if the compensation value has been already set.

In the case that a highly-precise compensation value is required, it is preferred to take the method as shown in the compensation value setting operation. Regarding the relation between the temperature and the resistance change of pressure sensitive resistance element 10, in general, a thermal hysteresis is caused by a intrinsic temperature hysteresis of pressure sensitive resistance element 10 and a difference between temperature changes of temperature sensor and pressure sensitive resistance element 10. The temperature hysteresis depends on the mounting position of temperature sensor 16. This hysteresis causes a compensation error between the temperature rising and the temperature falling. In the case that the compensation value is determined by changing from lowest operating temperature T1 to highest operating temperature T2, the compensation error is larger in the temperature falling than in the rising in the ordinary operation. Accordingly, the compensation error in the ordinary operation can be decreased by setting the compensation value by averaging compensation values determined by changing the temperature from temperature T1 to temperature T2 and from temperature T2 to temperature T1.

A/D converter 12 is used in the manner of switching over temperature sensor 16 and adjustment value input terminal 17. But the same effect is obtained by using A/D converters for them, respectively.

The output of pressure sensitive resistance element 10 is fed into other A/D converter than that connected to temperature sensor 16 and adjustment value input terminal 17. But the same effect is obtained by feeding it into the common A/D converter by employing a changeover switch or the like.

In the case that two or more pressure sensitive resistance elements 10 are used, the number of A/D converters 13 are increased, or the changeover switch of the input of them is added. And then, a D/A converter for the output is added, and the same effects are obtained.

If compensated by applying several values of pressure to pressure sensitive resistance element 10 in the compensation value setting operation, the compensation value corresponding to each pressure may be obtained.

Embodiment 3

Figure 8:
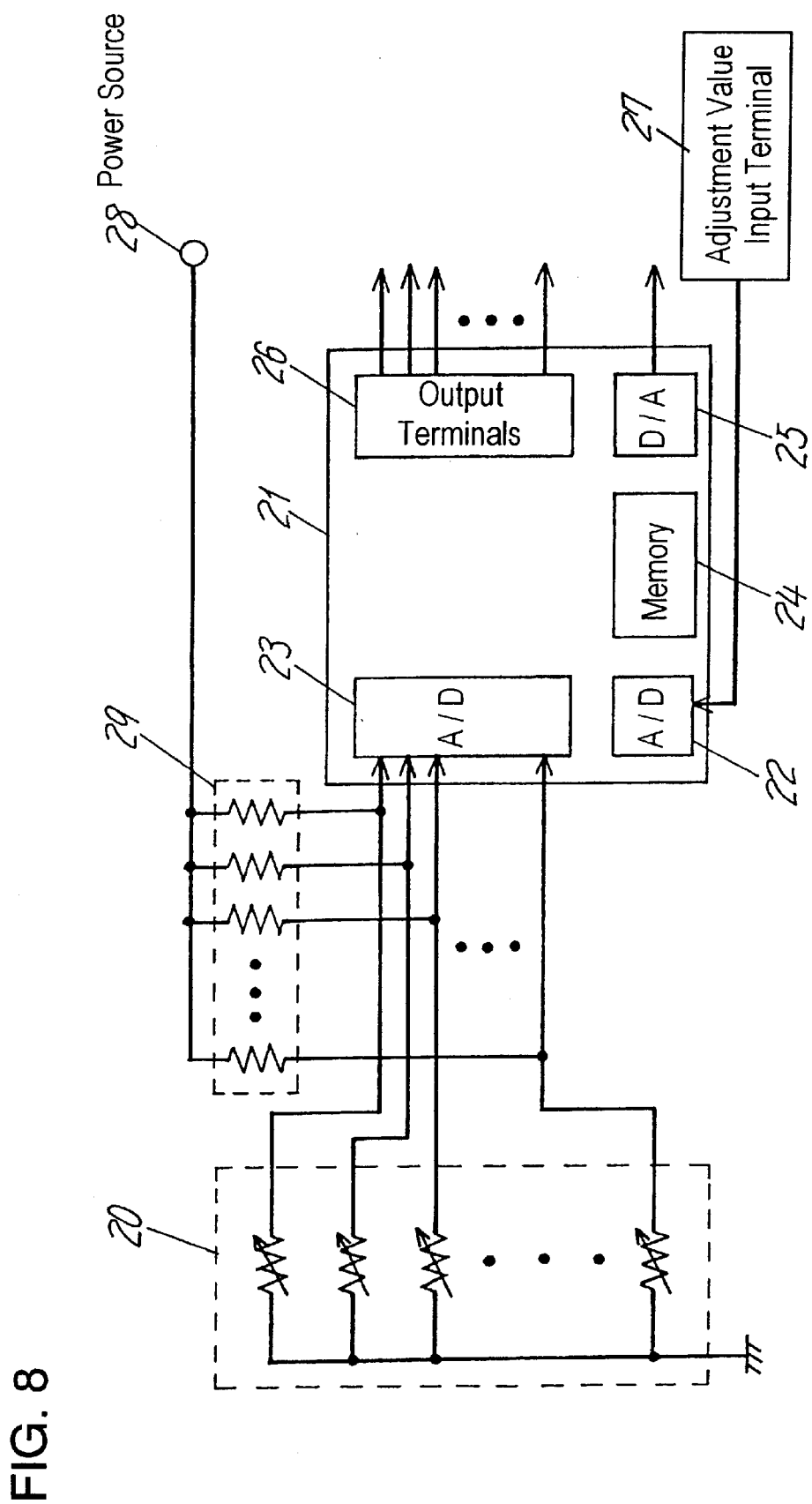
FIG. 8 is a block diagram of a sensed-pressure-data converter according to embodiment 3 of the invention.

FIG. 8 shows a sensed-pressure-data converter in embodiment 3 of the invention. In FIG. 8, reference numeral 20 denotes a pressure sensitive resistance element group composed of two or more pressure sensitive resistance elements. Each of them is disposed in two face-to-face insulating substrates as shown in FIG. 14, grounded at one side, and indicated by a symbol of a variable resister. Reference numeral 21 denotes a controller. Reference numerals 22 and 23 denote A/D converters included in controller 21. A/D converter 23 is connected to the non-grounded side of pressure sensitive resistance element group 20. Reference numeral 24 denotes a memory included in controller 21. Reference numeral 25 denotes a D/A converter included in controller 21. Reference numeral 26 denotes an output terminal group included in controller 21. Reference numeral 27 denotes an adjustment value input terminal connected to A/D converter 22. Reference numeral 28 denotes a power source. Reference numeral denotes a resistance group connected between the non-grounded side of pressure sensitive resistance element group 20 and power source 28.

The operation in the sensed-pressure-data converter having such constitution will be explained. The converter is mainly responsible for two operations, a compensation value setting operation and the other is an ordinary operation same as in embodiment 1.

Figure 9:
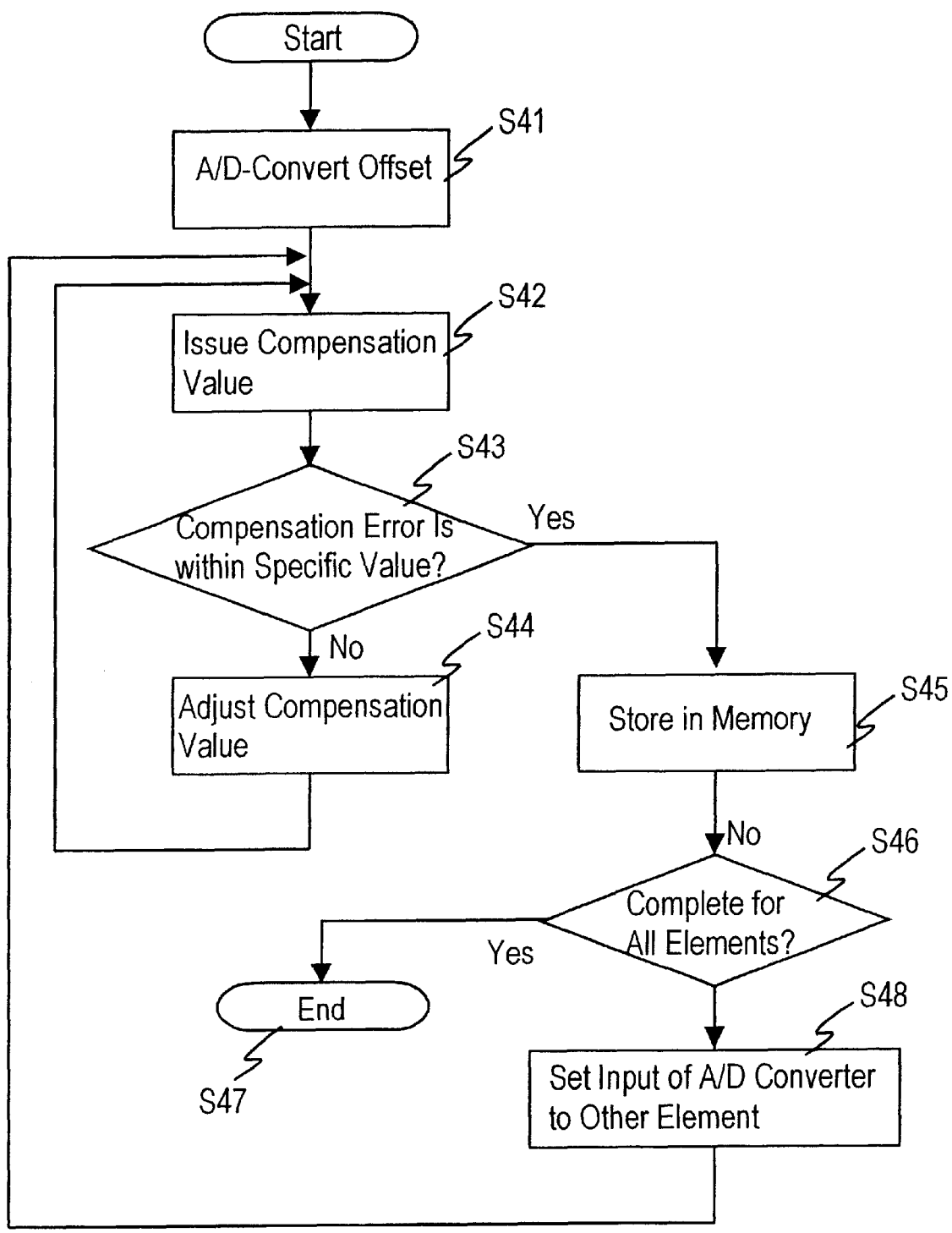
FIG. 9 is a flowchart of a control procedure of a setting operation of a compensation value of the converter.

First, the compensation value setting operation will be explained. Prior to explain the operation, a control procedure of controller 21 will be explained by referring to the flowchart in FIG. 9. For setting the compensation value, in each pressure sensitive resistance element in pressure sensitive resistance element group 20, an error signal between the output of D/A converter 25 in controller 21 and the output reference value of controller 21 is input to adjustment value input terminal 27. In controller 21, the error signal is A/D-converted in A/D converter 22 through adjustment value input terminal 27 at step S41. In other A/D converter 23, the voltage pulled up to the power source 28 by the resistance group 29 when a certain pressure is applied to each pressure sensitive element of sensitive resistance element group 20 is input and A/D-converted. The difference of the A/D-converted values shows an offset error of the sensed-pressure-data converter. The value compensated at step S42 on the basis of these A/D converted values is issued from D/A converter 25. And simultaneously, a signal showing which pressure sensitive resistance element of group 20 issues the value is output from a terminal of terminal group 26, which terminal is corresponding to a pressure sensitive resistance element one by one. At steps S43 and S44, this value is issued from each pressure sensitive resistance element of pressure sensitive resistance element group 20 and adjusted. Controller 21 again A/D-converts the signal from adjustment value input terminal 27 and judges, at step S43, whether this value is within the specific set value as a compensation error. If this value is within the specific set value, at step S45, this value is stored in memory 24 as a compensation value. The controller judges, at step S46, whether the value is stored in memory 24 for each pressure sensitive resistance element of pressure sensitive resistance element group 20. If that is not completed for all elements, at step S48, the input of A/D converter 23 is switched to other pressure sensitive resistance element of pressure sensitive resistance element group 20, and the operation after step S42 is repeated for all pressure sensitive resistance elements. When that is completed for all pressure sensitive resistance elements, the compensation value setting operation is terminated at step S47. If the value is not within the specific set value, at step S44, the compensation value is adjusted, and this operation is repeated until the value settles within the specific set value.

Figure 10:
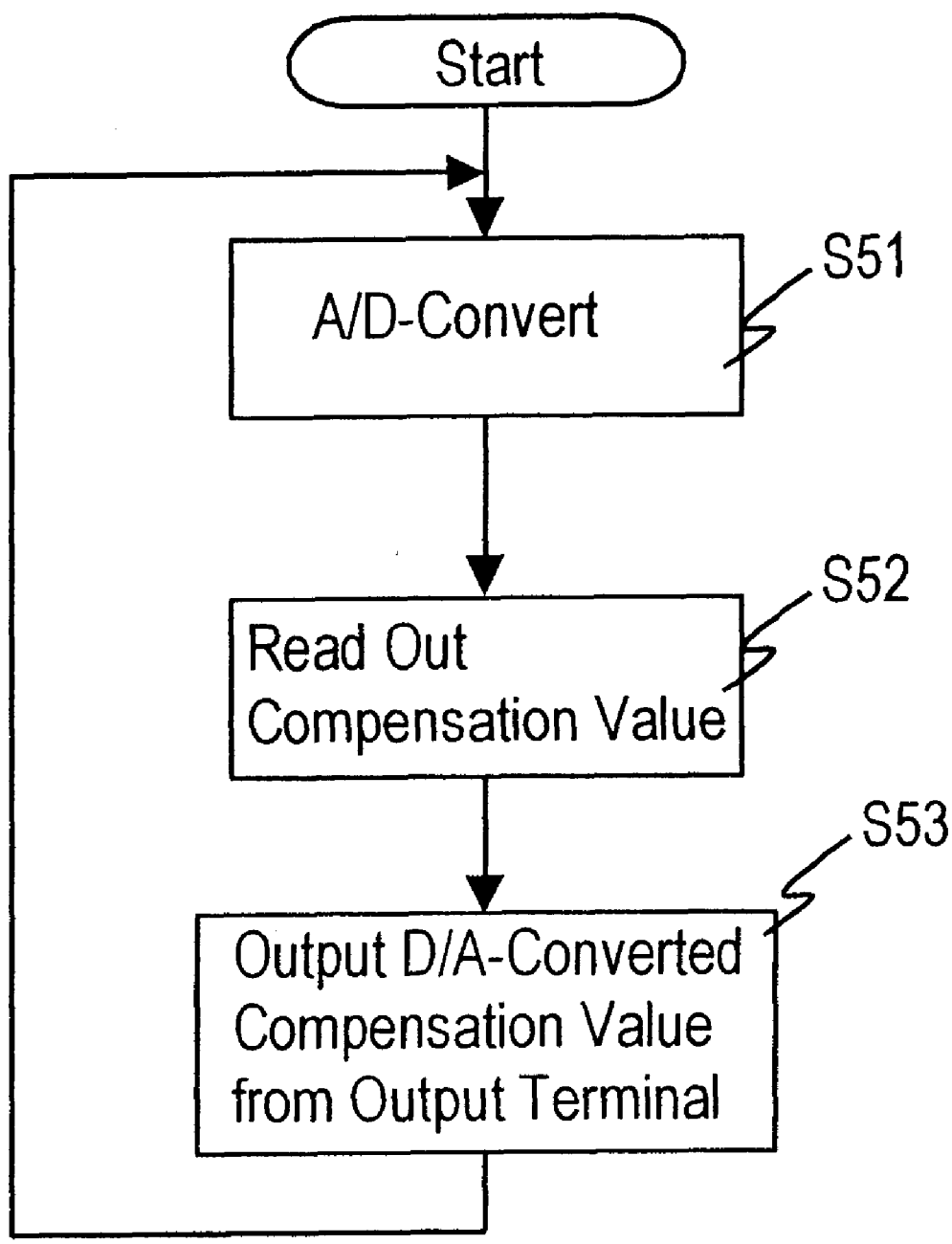
FIG. 10 is a flowchart of a control procedure of an ordinary operation of the converter.

Next, referring next to the flowchart in FIG. 10, the ordinary operation will be explained. Controller 21 feeds the output of the pressure sensitive resistance element group 20 into A/D converter 23 and A/D-converts it at step S51. At next step S52, the compensation value is read out from memory 24 and issued from D/A converter 25 at step S53. And simultaneously, a signal showing which pressure sensitive resistance element issues the value is output from a terminal of output terminal group 26, which terminal corresponds to the pressure sensitive resistance element of element group 23 one by one. In the ordinary operation, this procedure is repeated.

Therefore, even if plural pressure sensitive resistance elements are employed, offsets due to fluctuations of pressure sensitive resistance elements can be decreased. And even if the resistances fluctuate, the value can be converted and issued while the offsets are cancelled effectively.

Regarding the start-up of the compensation value setting operation, by providing controller 21 with the adjustment value input terminal, the compensation value setting operation can be started again even if the compensation value has been already set.

The output of the pressure sensitive resistance element group 20 is fed into other A/D converter than that connected to adjustment value input terminal 27. But the same effect is obtained by feeding it into the same A/D converter by using a changeover switch or the like.

Moreover, in the compensation value setting operation, when compensated in the condition that several values of pressure are applied to pressure sensitive resistance element group 20, the compensation value corresponding to each pressure may be obtained.

In output terminal group 26, each terminal corresponding to the pressure sensitive resistance element one by one outputs a signal. But by outputting the signal showing which pressure sensitive resistance element issues the value may be output from the output terminal in the form of a serial communication, the same effect is obtained with less number of output terminals than pressure sensitive resistance elements.

Embodiment 4

Figure 11:
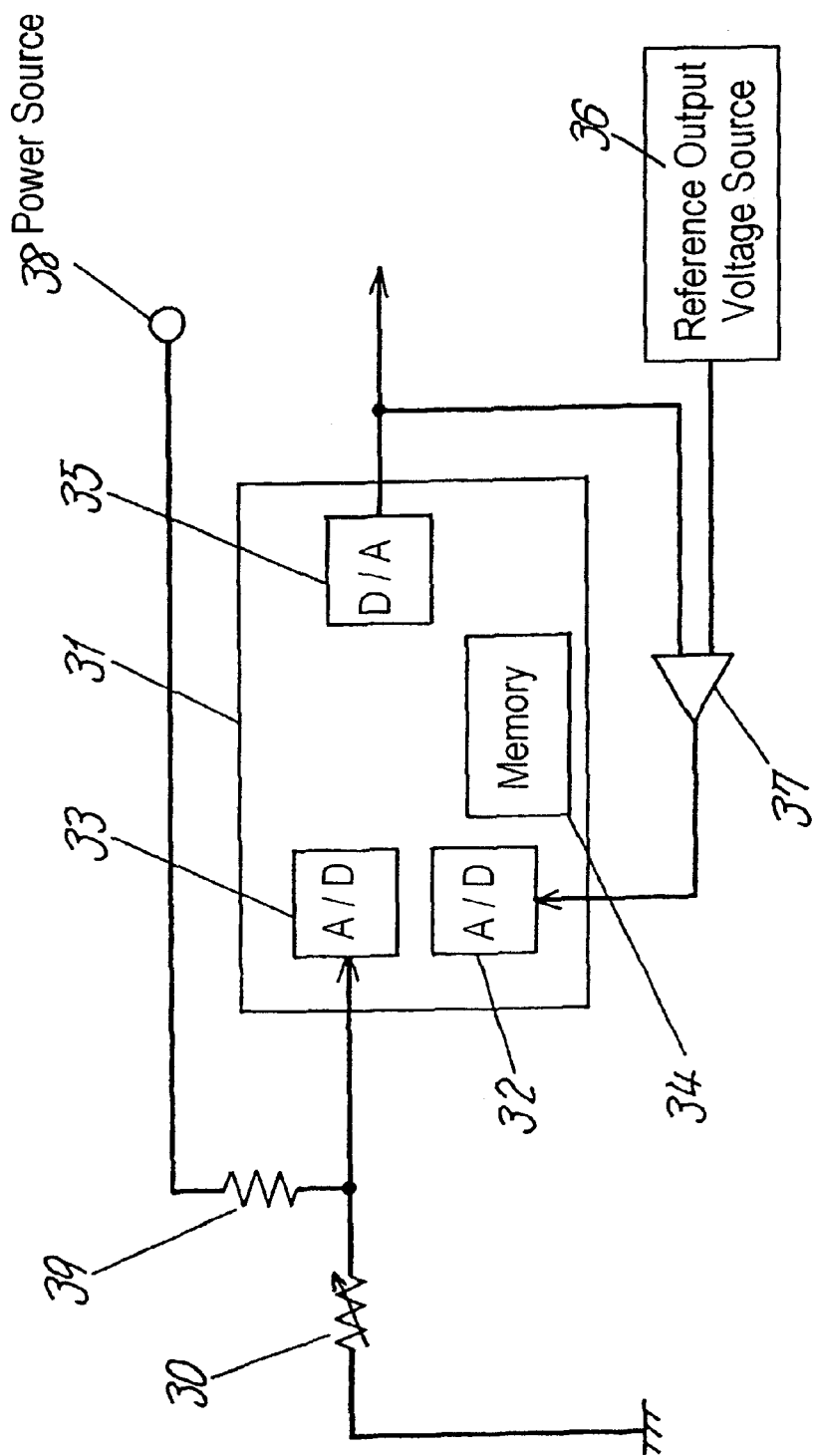
FIG. 11 is a block diagram of a sensed-pressure-data converter according to embodiment 4 of the invention.

FIG. 11 shows a sensed-pressure-data converter in embodiment 4 of the invention. In FIG. 11, reference numeral 30 denotes a pressure sensitive resistance element which is disposed between two face-to-face insulating substrates as shown in FIG. 14, grounded at one side, and indicated by an electric abbreviation symbol of a variable resister. Reference numeral 31 denotes a controller. Reference numerals 32 and 33 are A/D converters included in controller 31. A/D converter 33 is connected to the non-grounded side of pressure sensitive resistance element 30. Reference numeral 34 denotes a memory included in controller 31. Reference numeral 35 denotes a D/A converter included in controller 31. Reference numeral 36 denotes a reference output voltage source. Reference numeral 37 denotes an error amplifier receiving the outputs of D/A converter 35 and reference output voltage source 36 and issuing an error between them to A/D converter 32. Reference numeral 38 denotes a power source. Reference numeral 39 denotes a resistance connected between the non-grounded side of pressure sensitive resistance element 30 and power source 38.

The operation in the sensed-pressure-data converter having such constitution will be explained. Basically it is same as in embodiment 1, and thus, only difference will be specifically described. Controller 31 is responsible for a compensation value setting operation and an ordinary operation and operates in the same manner as shown in embodiment 1. However, in the compensation value setting operation, as compared with embodiment 1 in which the value through adjustment value input terminal 7 is A/D-converted, the output of error amplifier 37 is A/D-converted herein. The output of error amplifier 37 is same as the input from the adjustment value input terminal in embodiment 1. Reference output voltage source 36 always outputs the central value of the offset of the sensed-pressure-data converter, and this value must be sufficiently more stable for temperature and time than that of the sensed-pressure-data converter.

In this constitution, in addition to the same effects as in embodiment 1, the following effects are obtained. Thanks to error amplifier 37, it is not necessary to input the adjustment value from outside in the compensation value setting operation. However, to enhance the compensation precision, changes with temperature and time of reference output voltage source 36 and error amplifier 37 must be sufficiently smaller than the resolution of A/D converter 33 in controller 31.

Embodiment 5

Figure 12:
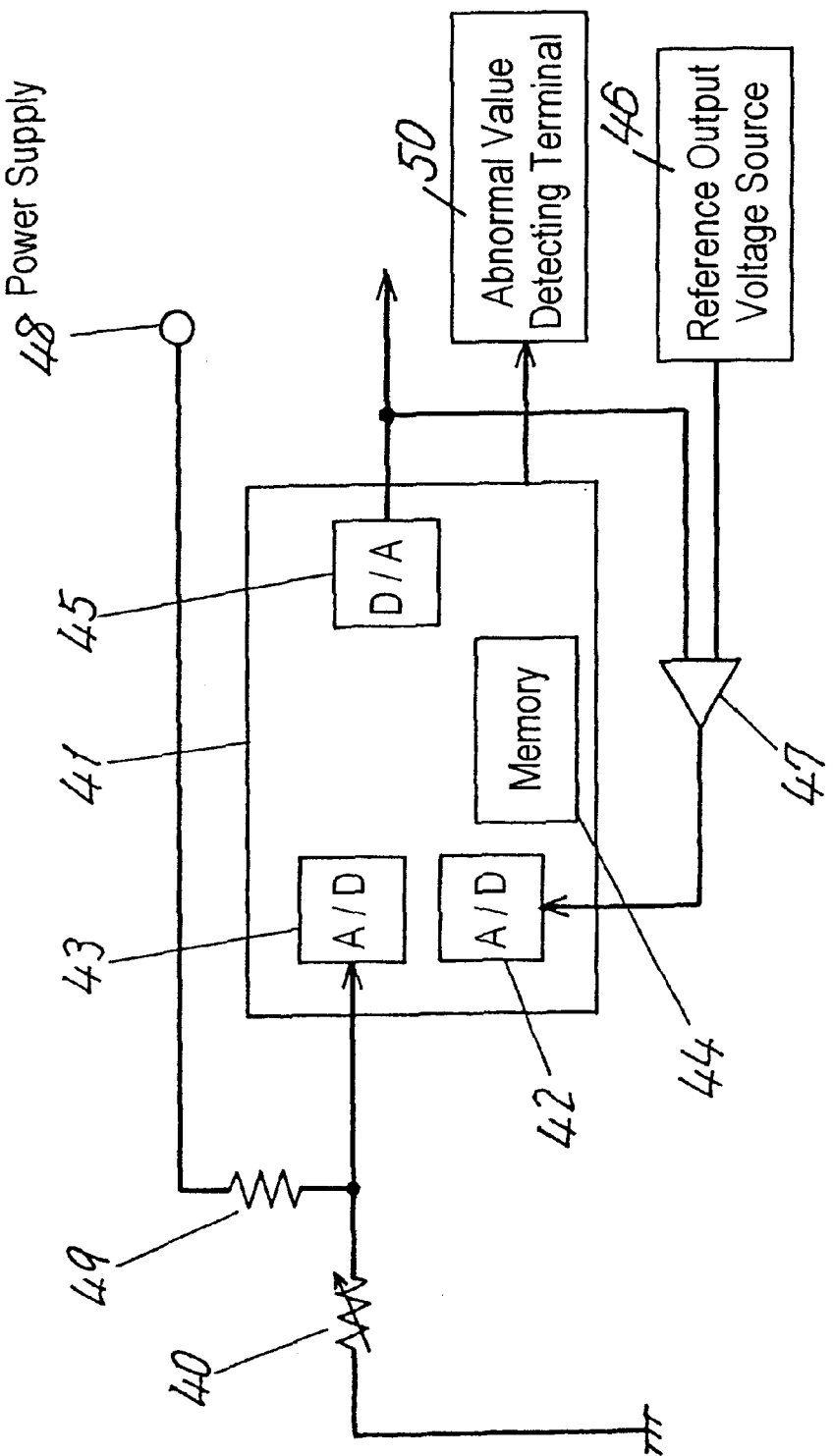
FIG. 12 is a block diagram of a sensed-pressure-data converter according to embodiment 5 of the invention.

FIG. 12 shows a sensed-pressure-data converter in embodiment 5 of the invention. In FIG. 12, reference numeral 40 denotes a pressure sensitive resistance element disposed between two face-to-face insulating substrates as shown in FIG. 14, grounded at one side, and indicated by an electric abbreviation symbol of a variable resister. Reference numeral 41 denotes a controller. Reference numerals 42 and 43 are A/D converters included in controller 41. A/D converter 43 is connected to the non-grounded side of pressure sensitive resistance element 40. Reference numeral 44 denotes a memory included in controller 41. Reference numeral 45,denotes a D/A converter included in controller 41. Reference numeral 46 denotes a reference output voltage source. Reference numeral 47 denotes an error amplifier receiving the outputs of D/A converter 45 and reference output voltage source 46 and issuing an error signal between them to A/D converter 42. Reference numeral 48 denotes a power source. Reference numeral 49 denotes a resistance connected between the non-grounded side of pressure sensitive resistance element 40 and power source 48. Reference numeral 50 denotes an abnormal value detecting terminal connected to controller 41.

The operation will be explained. Basically, it is same as in embodiment 3, and only the difference will be specifically described. Controller 41 is responsible for a compensation value setting operation and an ordinary operation and operates in the same manner as shown in embodiment 4. However, in the operation shown below, abnormality is judged as shown in FIG. 13.

Figure 13:
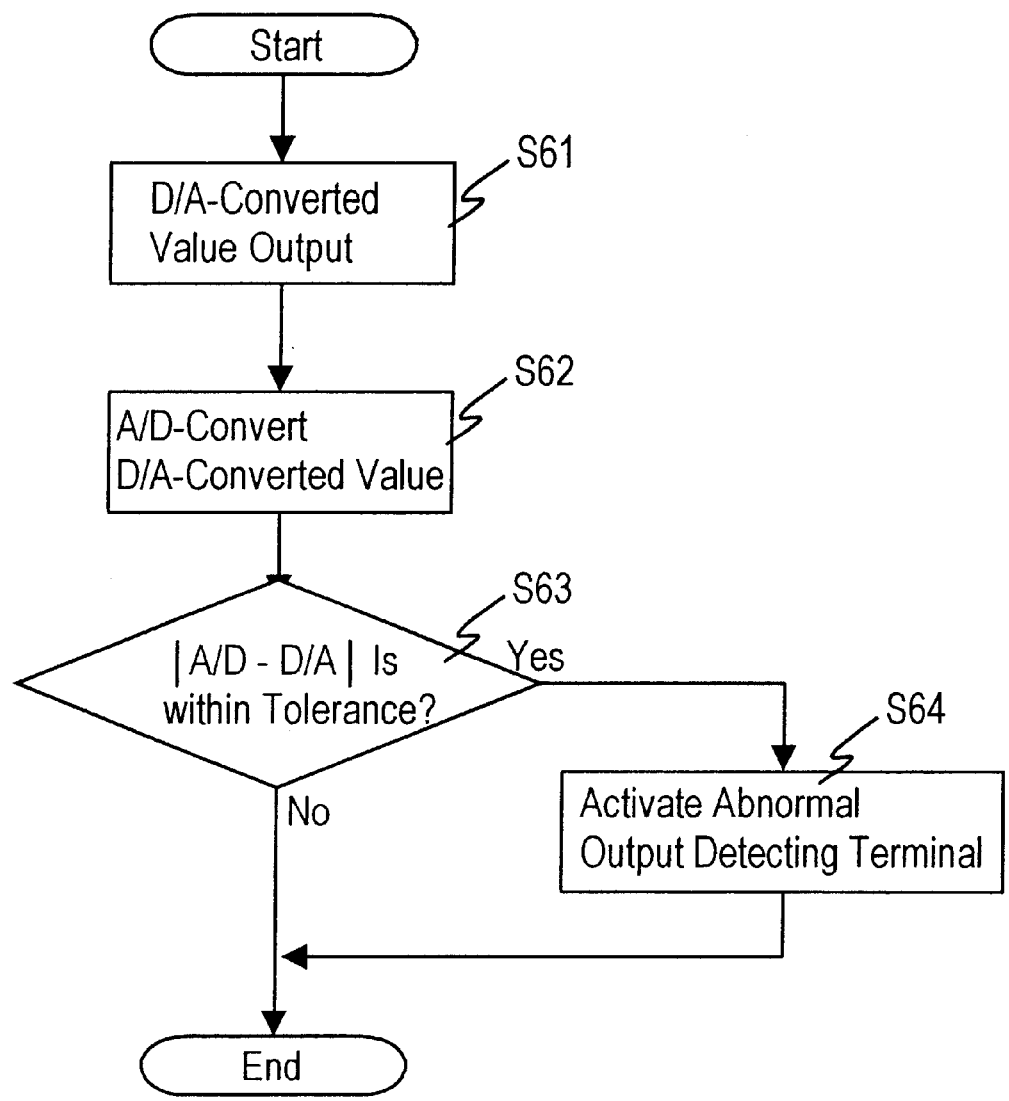
FIG. 13is a flowchart of a failure detection of the converter.

As shown in FIG. 13, a value A/D-converted and issued at step S62 by D/A converter 45 is read and A/D-converted by A/D converter 42 at step S62. And then, it is judged whether the D/A-converted value coincides with the A/D-converted value at step S63. It is judged abnormal if the values don't coincide with each other even with a tolerance as an error, and abnormal value detecting terminal 50 is activated at step S64.

In the case that the temperature sensor is mounted as in embodiment 2 of the invention, abnormality of temperature can be detected by making the abnormality detecting terminal active when the temperature is out of the operating temperature range.

INDUSTRIAL APPLICABILITY

According to the invention, provided with a controller having a compensation function of the output of a pressure sensitive resistance element, a sensed-pressure-data converter reduces the offset and offset drift of the pressure sensitive resistance element having a large intrinsic offset and offset drift.

What is claimed is:

1. A sensed-pressure-data converter comprising:
    a pressure sensitive resistance element comprising:
        two insulating substrates disposed face to face; and
        a pressure sensitive conductor interposed between said insulating substrates, for varying a resistance thereof according to a load applied from an outside of said insulating substrates;
    a controller for detecting an electric characteristic of said pressure sensitive resistance element, converting the electric characteristic into a desired electric characteristic signal, and issuing a desired electric characteristic signal, comprising:
        an A/D converter receiving a signal from said pressure sensitive resistance element
        a memory preliminarily storing a compensation value determined based on an error signal between the electric characteristic of said pressure sensitive resistance element and a reference electric characteristic; and
        a D/A converter compensating a signal from said A/D converter based on the electric characteristic of said pressure sensitive resistance element due to a resistance change of said pressure sensitive resistance element based on the compensation value stored in said memory and issuing the compensated signal;
    an adjustment value input terminal for inputting the error signal into an input terminal of said A/D converter; and
    an error amplifier for receiving an output of said D/A converter and a reference value and for outputting the error signal to said adjustment value input terminal.

2. The sensed-pressure-data converter according to claim 1, wherein said controller further comprises a temperature sensor for compensating suitably to an ambient temperature of said pressure sensitive resistance element.

3. The sensed-pressure-data converter according to claim 1 comprising a plurality of said pressure sensitive resistance elements, wherein said controller further comprises output terminals corresponding to the plurality of said pressure sensitive resistance elements, respectively.

4. The sensed-pressure-data converter according to claim 1 further comprising:
    a reference output voltage source for issuing the reference value on an offset of an output of said D/A converter.

5. The sensed-pressure-data converter according to claim 1, wherein said controller further comprises an abnormality detecting output terminal for detecting and outputting a signal showing an abnormality of a signal processing in said controller.

* * * * *